US012759346B2

(12) United States Patent
Durand-Gasselin et al.

(10) Patent No.: US 12,759,346 B2

(45) Date of Patent: Oct. 13, 2026

(54) TIRE COMPRISING HYBRID TRANSVERSE CUTS

(71) Applicant: COMPAGNIE GENERALE DES ETABLISSEMENTS MICHELIN, Clermont-Ferrand (FR)

(72) Inventors: Benoit Durand-Gasselin, Clermont-Ferrand (FR); Miguel Fernandez, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 18/576,894

(22) PCT Filed: Jul. 6, 2022

(86) PCT No.: PCT/FR2022/051351

§ 371 (c)(1),
(2) Date: Jan. 5, 2024

(87) PCT Pub. No.: WO2023/281214

PCT Pub. Date: Jan. 12, 2023

(65) Prior Publication Data

US 2025/0091388 A1 Mar. 20, 2025

(30) Foreign Application Priority Data

Jul. 7, 2021 (FR) ...................................... 2107347

(51) Int. Cl.

*B60C 11/12* (2006.01)
*B60C 11/13* (2006.01)
(Continued)

(52) U.S. Cl.

CPC ........... *B60C 11/125* (2013.01); *B60C 11/005* (2013.01); *B60C 11/0306* (2013.01);
(Continued)

(58) Field of Classification Search

CPC ............... B60C 11/005; B60C 11/0302; B60C 11/0304; B60C 11/0306; B60C 2011/0381; B60C 11/125
See application file for complete search history.

(56) References Cited

U.S. PATENT DOCUMENTS

| | | | |
|---|---|---|---|
| 9,085,201 | B2 | 7/2015 | Horiguchi |
| 9,302,552 | B2 | 4/2016 | Mukai |

(Continued)

FOREIGN PATENT DOCUMENTS

| | | | |
|---|---|---|---|
| CN | 102673318 | A | 9/2012 |
| CN | 107813661 | A | 3/2018 |

(Continued)

OTHER PUBLICATIONS

Copending U.S. Appl. No. 19/117,862, filed Sep. 25, 2023.
International Search Report dated Sep. 16, 2022, in corresponding PCT/FR2022/051351 (5 pages).

*Primary Examiner* — Robert C Dye
(74) *Attorney, Agent, or Firm* — VENABLE LLP

(57) ABSTRACT

The tire (10) comprises so-called hybrid transverse cuts made in first and second axially lateral portions (P1) and comprises: a narrow axially inner portion (80) having a width at the bottom (94) of the cut ranging from 0.2 mm to 0.6 mm, and a wide axially outer portion (82) having a width at the bottom (94) of the cut ranging from 0.7 mm to 5.0 mm. Each hybrid transverse cut has a bottom (94) that is entirely arranged radially outside an interface (114) between a tread layer (110) and a supporting layer (112). The bottom (94) of the narrow axially inner portion (80) is arranged at a radial distance (di) from the interface (114) strictly greater than the radial distance (de) at which the bottom (94) of the wide axially outer portion (82) is arranged.

13 Claims, 5 Drawing Sheets

(51) Int. Cl.
*B60C 11/00* (2006.01)
*B60C 11/03* (2006.01)

(52) U.S. Cl.
CPC ................. *B60C 2011/0341* (2013.01); *B60C 2011/0365* (2013.01); *B60C 2011/0369* (2013.01); *B60C 2011/0372* (2013.01)

(56) References Cited

U.S. PATENT DOCUMENTS

| | | | | |
|---|---|---|---|---|
| 9,919,565 | B2 | 3/2018 | Bourgeois et al. | |
| 10,449,807 | B2 | 10/2019 | Mukai | |
| 10,864,775 | B2 | 12/2020 | Oba | |
| 2012/0085471 | A1 | 4/2012 | Horiguchi | |
| 2012/0227881 | A1* | 9/2012 | Kudo | B60C 11/1259 152/209.14 |
| 2013/0112325 | A1 | 5/2013 | Mukai | |
| 2016/0185160 | A1 | 6/2016 | Mukai | |
| 2016/0214437 | A1 | 7/2016 | Bourgeois et al. | |
| 2018/0072105 | A1* | 3/2018 | Wakasugi | B60C 11/1218 |
| 2018/0319219 | A1 | 11/2018 | Oba | |
| 2019/0160879 | A1* | 5/2019 | Arai | B60C 11/1263 |

FOREIGN PATENT DOCUMENTS

| | | | | | |
|---|---|---|---|---|---|
| CN | 109968913 | A | | 7/2019 | |
| EP | 2594413 | A1 | | 5/2013 | |
| EP | 3508354 | A1 | * | 7/2019 | B60C 11/0058 |
| EP | 3838624 | A1 | * | 6/2021 | B60C 11/12 |
| JP | 2010260480 | A | * | 11/2010 | |
| WO | 2009/124816 | A1 | | 10/2009 | |
| WO | 2012/175444 | A1 | | 12/2012 | |
| WO | 2015/032601 | A1 | | 3/2015 | |
| WO | 2021/229160 | A1 | | 11/2021 | |

* cited by examiner

TIRE COMPRISING HYBRID TRANSVERSE CUTS

BACKGROUND

The present invention relates to a tyre for a passenger vehicle. Tyre is given to mean a casing intended to form a cavity by cooperating with a support element, for example a rim, this cavity being able to be pressurized to a pressure higher than atmospheric pressure. A tyre according to the invention has a structure of substantially toroidal shape exhibiting symmetry of revolution about a main axis of the tyre.

A tyre for a passenger vehicle, sold under the MICHELIN® trade name in the PRIMACY 4® range, is known from the prior art. Such a tyre comprises a tread intended to come into contact with the ground when the tyre is running, via a tread surface borne by a tread layer. The tyre also comprises a supporting layer of the tread layer, also called a sublayer, arranged radially inside the tread layer.

The tread comprises main circumferential cuts having a depth greater than or equal to 50% of the tread-pattern height and comprising first and second axially outer main circumferential cuts on either side of the mid-plane of the tyre. The first and second axially outer main circumferential cuts are the axially outermost main circumferential cuts of the tread.

The tread comprises ribs respectively arranged axially between two adjacent main circumferential cuts and axially delimited by said two adjacent main circumferential cuts. The ribs comprise in particular a first axially lateral portion and a second axially lateral portion respectively arranged axially outside the first axially outer main circumferential cut and the second axially outer main circumferential cut.

Each first and second axially lateral portion comprises transverse cuts comprising sipes having, at the bottom of the cut, a width equal to 0.4 mm over the entire curvilinear length of each sipe.

It has been noted that in some cases this tyre exhibits chunking of parts of the tread in the first and second axially lateral portions.

Tyres are also known from U.S. Pat. Nos. 9,085,201, 10,864,775, US2013112325 and U.S. Pat. No. 10,449,807.

The invention aims to reduce or even eliminate the presence of this chunking without excessively compromising the rolling resistance performance and grip performance on wet ground.

SUMMARY

To that end, the invention relates to a tyre for a passenger vehicle. comprising a tread intended to come into contact with the ground when the tyre is running, via the tread surface, the tread comprising:

- main circumferential cuts having a depth greater than or equal to 50% of the tread-pattern height, comprising first and second axially outer main circumferential cuts arranged axially on either side of the mid-plane of the tyre, the first and second axially outer main circumferential cuts being the axially outermost main circumferential cuts of the tread,
- a first axially lateral portion arranged axially outside the first axially outer main circumferential cut and extending axially from a first axial edge of the tread surface to the first axially outer main circumferential cut,
- a second axially lateral portion arranged axially outside the second axially outer main circumferential cut and extending axially from a second axial edge of the tread surface to the second axially outer main circumferential cut,

- the tyre comprising a tread layer and a supporting layer of the tread layer, the supporting layer being arranged radially inside the tread layer,
- the tread comprising so-called hybrid transverse cuts made at least partially in at least one of the first and second axially lateral portions, each hybrid transverse cut comprising:
  - a so-called narrow axially inner portion having, at the bottom of the cut, a width ranging from 0.2 mm to 0.6 mm, the narrow axially inner portion being the axially innermost portion of the hybrid transverse cut in the at least one of the first and second axially lateral portions,
  - a so-called wide axially outer portion having, at the bottom of the cut, a width ranging from 0.7 mm to 5.0 mm, communicating with the narrow axially inner portion, arranged axially outside the narrow axially inner portion, the wide axially outer portion being the axially outermost portion of the hybrid transverse cut in the at least one of the first and second axially lateral portions,
- each hybrid transverse cut having a hybrid transverse cut bottom, the entire bottom of each hybrid transverse cut being arranged radially outside an interface between the tread layer and the supporting layer,
- at least part of the bottom of the narrow axially inner portion being arranged at a radial distance from the interface strictly greater than the radial distance at which at least part of the bottom of the wide axially outer portion is arranged.

The inventors behind the invention have understood that the chunking occurred because, during the moulding of the tyre that makes it possible to make the sipes in the axially lateral portions, the uncured elastomer compositions of the or each axially lateral portion are subject to penetration by the moulding element, in this case a sipe blade, for moulding each sipe. The inventors have understood that this penetration is greater the narrower the width at the bottom of the sipe and the deeper the sipe. The finer the sipe blade, the more it is capable of cutting into the elastomer compositions of the or each axially lateral portion. If, in addition, this sipe blade penetrates deep into the elastomer compositions, it is capable of penetrating the interface between the tread layer and the supporting layer, which has the effect of moving the supporting layer radially outwards. Such radially outward movement of the supporting layer, in particular on an axially outer portion of the axially lateral portions, causes the interface to appear on the tread surface when the tyre is significantly worn. As such an interface is not designed to be in contact with the ground on which the tyre is running, it deteriorates rapidly, resulting in the aforementioned chunking.

Faced with such a problem, the inventors behind the invention have designed hybrid transverse cuts the bottom of which is arranged radially outside the interface between the tread layer and the supporting layer so as to prevent the hybrid transverse cut from penetrating this interface. In other words, the bottom of each hybrid transverse cut does not cut into the interface.

Firstly, in the invention, the part of the tread most likely to exhibit chunking comprises the wide axially outer portion of the hybrid transverse cut. The inventors behind the invention have noted that, unlike the moulding of a sipe, the moulding of a transverse cut having a width greater than or equal to 0.7 mm does not result in a radially outward movement of the interface by penetration thereof, but a radially inward movement due to the moulding pressure, which reduces the appearance of the interface on the surface of the tyre, and therefore reduces chunking.

Secondly, having part of the bottom of the narrow axially inner portion arranged radially further from the interface than part of the bottom of the wide axially outer portion reduces the possibility that the portion of the interface arranged in line with the narrow axially inner portion will be penetrated by the moulding element for moulding the narrow axially inner portion. The risk of chunking is thus reduced.

The radial distance between the bottom of the portions and the interface is the distance measured in the radial direction. The distance from a part is the distance measured for each point of that part. Part of the bottom of the narrow axially inner portion is thus arranged radially further from the interface than part of the bottom of wide axially outer portion if all of the points of this part of the bottom of the narrow axially inner portion are arranged at a radial distance strictly greater than the distance at which all of the points of the part of the bottom of wide axially outer portion are arranged.

In addition, the hybrid transverse cuts of the tyre according to the invention make it possible to preserve the rolling resistance performance and grip performance on wet ground. The transverse cuts are said to be hybrid due to the presence of two portions, one narrow and the other wide.

As the narrow portion of each hybrid transverse cut is the axially innermost portion of the hybrid transverse cut in the axially lateral portion, it is situated in a corresponding portion of the tread in which the height of the tread is relatively great. The greater the height of the tread, the greater the Poisson effect and the more the rolling resistance is degraded by the presence of a cut. Due to the relatively small width of the narrow axially inner portion, the Poisson effect is limited by allowing the two main lateral faces of the narrow axially inner portion to come into contact with each other when the tyre passes through the contact patch, which reduces the rolling resistance. As the wide axially outer portion is the axially outermost portion of the hybrid transverse cut in the axially lateral portion, it is situated in a portion of the tread in which the height of the tread is necessarily smaller due to the curvature of the tyre. The Poisson effect is therefore lower here and the width of the wide axially outer portion has little detrimental impact on the rolling resistance.

In addition, the wide axially outer portion of each hybrid transverse cut allows effective drainage of water and in any case improved drainage compared to that of the tyre of the prior art due to the relatively large width at the bottom of the cut.

The narrow axially inner portion can be likened to a sipe and the wide axially outer portion can be likened to a groove, provided that it is sufficiently wide. A sipe is such that the distance between the main lateral faces is suitable for allowing the main lateral faces that delimit said sipe to come into at least partial contact in the contact patch, in particular when the tyre is new and under normal running conditions, in particular including the fact that the tyre is under nominal load and at nominal pressure. A groove is such that the distance between the main lateral faces is such that these main lateral faces cannot come into contact with one another under normal running conditions, in particular including the fact that the tyre is under nominal load and at nominal pressure.

Conventionally, the tread surface is axially delimited by the first and second axial edges. The first and second axial edges of the tread surface are determined on a tyre mounted on a nominal rim and inflated to nominal pressure in accordance with the European Tyre and Rim Technical Organisation, or "ETRTO", standard of 2019. The first and second axial edges of the tread surface are arranged on either side of the mid-plane of the tyre and formed by lines substantially parallel to the circumferential direction of the tyre. If there is an obvious boundary between the tread surface and the rest of the tyre, the first and second axial edges of the tread surface are simply determined. If the tread surface is continuous with the outer surfaces of the sidewalls of the tyre, each first and second axial edge passes, in each meridian section plane, through the point at which the angle between the tangent to the tread surface and a straight line parallel to the axial direction passing through this point is equal to 30°. When, in a meridian section plane, there are several points at which said angle is equal, as an absolute value, to 30°, the radially outermost point is used.

The supporting layer of the tyre according to the invention is not intended to come into contact with the ground when the tyre is running when the wear of the tyre is less than the wear corresponding to the regulation wear threshold, which wear threshold is for example shown on the tyre by regulation wear indicators. In other words, the interface between the tread layer and the supporting layer is arranged, over at least 90% of its curvilinear length and preferably over 100% of its curvilinear length, radially inside a surface parallel to the tread surface of the tyre when new and passing through the radially outermost point of the regulation wear indicators. Such a supporting layer is in direct contact with the tread layer. The supporting layer is arranged radially inside the tread layer over the entire axial width of the supporting layer. The supporting layer is not a tread layer radially inside a radially outer tread layer.

The tread layer can comprise a single elastomer composition or a plurality of elastomer compositions arranged so as to optimize other performance criteria of the tyre, in particular in optimized radial and axial distributions as described in WO2015032601, WO2012175444, EP3508354, EP2594413 and WO2009124816.

The or each first and second axially lateral portion of the tread can of course comprise other transverse cuts that do not have the features of a hybrid transverse cut, as well as circumferential cuts having a depth strictly less than 50% of the tread-pattern height.

On a new tyre, the depth of a cut or cut portion is the maximum radial distance between the bottom of the cut or portion and its projection onto the ground when the tyre is running. The maximum value for the depths of the cuts is referred to as the tread-pattern height.

A cut or cut portion has, on the tread surface, two main characteristic dimensions: a width and a curvilinear length such that the curvilinear length is at least equal to two times the width. A cut or cut portion is therefore delimited by at least two main lateral faces determining its curvilinear length and connected by a bottom, the two main lateral faces being distant from each other by a non-zero distance referred to as the width of the cut or cut portion.

On a new tyre, the width of a cut or cut portion is the maximum distance between the two main lateral faces measured, by default and when the cut or cut portion is not chamfered, at a radial point coincident with the tread surface, and by default and when the cut or cut portion is chamfered, at the radially outermost radial point of the cut or cut portion and radially inside the chamfer. The width is measured substantially perpendicularly to the main lateral faces. If a width other than the default width is specified, for example a width at a particular point, the width is equal to the distance between the two main lateral faces at the particular point of the bottom of the cut or cut portion. In the case of the invention, whether or not the hybrid transverse cut is provided with a chamfer, the width at the bottom of the cut is equal to the distance between the two main lateral faces measured at the bottom of the corresponding portion of the cut.

A cut or cut portion can be transverse or circumferential.

A transverse cut is such that the cut extends in a mean direction that forms an angle strictly greater than 30°, preferably greater than or equal to 45° with the circumferential direction of the tyre, that is, that forms an angle less than or equal to 60°, preferably strictly less than 45°, with the axial direction of the tyre. The mean direction is the shortest curve joining the two ends of the cut and parallel to the tread surface. A transverse cut or portion can be continuous, that is, not interrupted by a tread pattern block or another cut, so that the two main lateral faces that determine its length are uninterrupted over the length of the transverse cut or portion. A transverse cut can equally be discontinuous, that is, interrupted by one or more tread pattern blocks and/or one or more cuts, so that the two main lateral faces that determine its length are interrupted by one or more tread pattern blocks and/or one or more cuts.

A circumferential cut is such that the cut or portion extends in a mean direction that forms an angle less than or equal to 30°, preferably less than or equal to 10°, with the circumferential direction of the tyre, that is, that forms an angle strictly greater than 60°, preferably strictly greater than 80°, with the axial direction of the tyre. The mean direction is the shortest curve joining the two ends of the cut and parallel to the tread surface. In the case of a continuous circumferential cut, the two ends coincide with each other and are joined by a curve that makes a complete turn around the tyre. A circumferential cut can be continuous, that is, not interrupted by a tread pattern block or another cut, so that the two main lateral faces that determine its length are uninterrupted over a complete turn around the tyre. A circumferential cut can equally be discontinuous, that is, interrupted by one or more tread pattern blocks and/or one or more cuts, so that the two main lateral faces that determine its length are interrupted by one or more tread pattern blocks and/or one or more cuts over a complete turn around the tyre.

In the case of a transverse cut or transverse cut portion, the lateral faces are referred to as leading face and trailing face and are each respectively provided with a leading edge and a trailing edge, the leading edge being the edge that, for a given circumferential line, enters the contact patch before the trailing edge.

In embodiments making it possible to optionally improve braking on dry ground, the or each hybrid transverse cut is provided with chamfers. A chamfer on a hybrid transverse cut can be a straight chamfer or rounded chamfer. A straight chamfer is formed by a planar face that is inclined with respect to the leading or trailing face that it extends up to the leading or trailing edge circumferentially delimiting the hybrid transverse cut. A rounded chamfer is formed by a curved face that merges tangentially into the leading or trailing face that it extends. A chamfer on a hybrid transverse cut is characterized by a height and a width that are respectively equal to the radial distance and to the distance in a direction perpendicular to the leading or trailing faces between the point common to the leading or trailing face extended by the chamfer and the leading or trailing edge that circumferentially delimits the hybrid transverse cut.

In some embodiments making it possible to optionally improve braking on wet ground, at least one of the main circumferential cuts is provided with chamfers. A chamfer on a circumferential cut can be a straight chamfer or rounded chamfer. A straight chamfer is formed by a planar face that is inclined with respect to the axially inner and outer face that it extends up to the axially inner or outer edge axially delimiting the circumferential cut. A rounded chamfer is formed by a curved face that merges tangentially into the axially inner or outer face that it extends. A chamfer on a circumferential cut is characterized by a height and a width that are respectively equal to the radial distance and to the axial distance between the point common to the axially inner or outer face extended by the chamfer and the axially inner or outer edge that axially delimits the circumferential cut.

The tyre according to the invention has a substantially toric shape about an axis of revolution substantially coincident with the axis of rotation of the tyre. This axis of revolution defines three directions conventionally used by a person skilled in the art: an axial direction, a circumferential direction and a radial direction.

Axial direction is given to mean the direction substantially parallel to the axis of revolution of the tyre, that is, the axis of rotation of the tyre.

Circumferential direction is given to mean the direction substantially perpendicular both to the axial direction and to a radius of the tyre (in other words, tangent to a circle centred on the axis of rotation of the tyre).

Radial direction is given to mean the direction along a radius of the tyre, that is, any direction that intersects the axis of rotation of the tyre and is substantially perpendicular to that axis.

Mid-plane of the tyre (denoted M) is given to mean the plane perpendicular to the axis of rotation of the tyre, which is situated axially halfway between the two beads and passes through the axial middle of the crown reinforcement.

Equatorial circumferential plane of the tyre (denoted E) is given to mean, in a meridian section plane, the plane passing through the equator of the tyre, perpendicular to the mid-plane and to the radial direction. The equator of the tyre is, in a meridian section plane (plane perpendicular to the circumferential direction and parallel to the radial and axial directions), the axis parallel to the axis of rotation of the tyre and situated equidistantly between the radially outermost point of the tread that is intended to be in contact with the ground and the radially innermost point of the tyre that is intended to be in contact with a support, for example a rim, the distance between these two points being equal to H.

Meridian plane is given to mean a plane parallel to and containing the axis of rotation of the tyre and perpendicular to the circumferential direction.

Radially inner/inside and radially outer/outside are given to mean closer to the axis of rotation of the tyre and further away from the axis of rotation of the tyre, respectively. Axially inner/inside and axially outer/outside are given to mean closer to the mid-plane of the tyre and further away from the mid-plane of the tyre, respectively.

Bead is given to mean the portion of the tyre intended to allow the tyre to be attached to a mounting support, for example a wheel comprising a rim. Each bead is thus in particular intended to be in contact with a flange of the rim allowing it to be attached.

Any range of values denoted by the expression "between a and b" represents the range of values extending from more than a to less than b (that is, excluding the end-points a and b), whereas any range of values denoted by the expression "from a to b" means the range of values extending from a to b (that is, including the strict end-points a and b).

In preferred embodiments of the invention, the tyres are intended for passenger vehicles as defined in accordance with the European Tyre and Rim Technical Organisation, or "ETRTO", standard of 2019. Such a tyre has a section in a meridian section plane characterized by a section height H and a nominal section width S, in accordance with the European Tyre and Rim Technical Organisation, or "ETRTO", standard of 2019, such that the ratio H/S, expressed as a percentage, is at most equal to 90, preferably at most equal to 80 and more preferably at most equal to 70, and is at least equal to 30, preferably at least equal to 40, and the nominal section width S is at least equal to 115 mm, preferably at least equal to 155 mm and more preferably at least equal to 175 mm, and at most equal to 385 mm, preferably at most equal to 315 mm, more preferably at most equal to 285 mm and even more preferably at most equal to 255 mm. In addition, the diameter D at the rim flange, which defines the diameter of the mounting rim of the tyre, is at least equal to 12 inches, preferably at least equal to 16 inches, and at most equal to 24 inches, preferably at most equal to 20 inches.

Optionally and preferably, each main circumferential cut has a depth greater than or equal to 75%, and more preferably greater than or equal to 90%, of the tread-pattern height.

In embodiments in which the main circumferential cuts are relatively deep and suitable for tyres for passenger vehicles, each main circumferential cut has a depth ranging from 4.0 mm to the tread-pattern height, preferably ranging from 5.0 mm to the tread-pattern height and more preferably ranging from 5.5 mm to the tread-pattern height.

In embodiments in which the main circumferential cuts are relatively wide main circumferential grooves and suitable for tyres for passenger vehicles, each main circumferential cut has an axial width greater than or equal to 1.0 mm, preferably greater than or equal to 5.0 mm and more preferably ranging from 5.0 mm to 20.0 mm.

In optional embodiments, it can also be envisaged that at least one of the first and second axially lateral portions comprises at least one additional circumferential cut having a depth strictly less than 50% of the tread-pattern height, preferably less than or equal to 30% of the tread-pattern height and more preferably ranging from 10% to 30% of the tread-pattern height.

In some embodiments, the narrow axially inner portion and the wide axially outer portion are adjacent. Adjacent is given to mean that no other portion is axially interposed between the narrow axially inner and wide axially outer portions.

In advantageous optional embodiments, each main lateral face of the hybrid transverse cut is connected to the bottom of the hybrid transverse cut by a fillet. Due to the presence of fillets, the formation of cracks, which are precursors to chunking, is reduced. The appearance of chunking is therefore reduced. This reduction of the formation of cracks is more effective the larger the radius of curvature of each fillet.

In an advantageous but optional embodiment that makes it possible to further reduce the appearance of chunking, at least 60%, preferably at least 75%, of the curvilinear length of the narrow axially inner portion is arranged at a radial distance from the interface strictly greater than a mean radial distance at which the bottom of the wide axially outer portion is arranged.

The longer the curvilinear length of the narrow axially inner portion arranged at a sufficient radial distance from the interface, the more the risk of chunking is reduced. However, the bottom of the narrow axially inner portion can be very close to the interface locally while still reducing the risk of chunking.

The curvilinear length of a transverse cut or a portion of a transverse cut, hybrid or otherwise, is the length measured along the curve passing equidistantly from the leading and trailing edges between the two ends of the transverse cut or portion.

In an advantageous but optional embodiment that makes it possible to reduce the appearance of chunking as much as possible, the bottom of the narrow axially inner portion is arranged at a mean radial distance from the interface strictly greater than the mean radial distance at which the bottom of the wide axially outer portion is arranged.

The mean radial distance is the mean of the radial distances between the interface and the bottom of a portion measured along said portion.

In some embodiments in which the bottom of the narrow axially inner portion is locally closer to the interface than the wide axially outer portion, the risk of chunking is thus still reduced.

In optional but preferred embodiments, the mean radial distance between the bottom of the wide axially outer portion and the interface ranges from 0.3 mm to 1.0 mm, preferably from 0.4 mm to 0.9 mm.

In optional but preferred embodiments, the mean radial distance between the bottom of the narrow axially inner portion and the interface ranges from 0.5 mm to 1.5 mm, preferably from 0.6 mm to 1.2 mm.

In an optional embodiment, at least part of the portion of the interface arranged radially in line with the narrow axially inner portion is arranged radially outside at least part of the portion of the interface arranged radially in line with the wide axially inner portion.

Even more preferably, the portion of the interface arranged radially in line with the narrow axially inner portion is arranged radially outside the portion of the interface arranged radially in line with the wide axially inner portion.

A supporting layer can thus advantageously be used that rises radially higher in the vicinity of the or each first and second main circumferential cut without any fear of increasing the risk of the appearance of chunking. Such a supporting layer makes it possible to optimize the performance of the tyre, for example its braking performance on wet ground, as explained in the application filed under number PCT/FR2021/050698, or its rolling resistance performance.

The portion of the interface arranged radially in line with the narrow axially inner portion is the portion of the interface delimited by axial ends defined by two circumferential planes perpendicular to the axis of rotation of the tyre and respectively passing through the axial ends of the narrow axially inner portion. Similarly, the portion of the interface arranged radially in line with the wide axially outer portion is the portion of the interface delimited by axial ends defined by two circumferential planes perpendicular to the axis of rotation of the tyre and respectively passing through the axial ends of the wide axially outer portion.

Optimally but optionally, the tread comprises hybrid transverse cuts partially made in each first and second axially lateral portion.

Optionally and advantageously, at least 50%, preferably at least 75% and more preferably at least 90% of the transverse cuts at least partially made in at least one of the first and second axially lateral portions, preferably at least partially made in each first and second axially lateral portion, are hybrid transverse cuts.

By reducing the number of transverse cuts other than the hybrid transverse cuts, the risk of the presence of chunking is thus reduced, in particular in the event that the transverse cuts other than the hybrid transverse cuts are sipes. The rolling resistance of the tyre is also reduced in the event that the transverse cuts other than the hybrid transverse cuts are grooves.

In optional but preferred embodiments, the mean radial distance between the bottom of the narrow axially inner portion and the interface ranges from 0.5 mm to 1.5 mm, preferably from 0.6 mm to 1.2 mm.

In optional but preferred embodiments, the mean radial distance between the bottom of the wide axially outer portion and the interface ranges from 0.3 mm to 1.0 mm, preferably from 0.4 mm to 0.9 mm.

As the tread is intended to come into contact with the ground when the tyre is running, via the tread surface, the curvilinear length is therefore determined in the relevant portion of the tread and therefore limited to the tread surface and therefore to the first and second axially lateral portions.

Optionally, so as to optimize the rolling resistance, the width of the narrow axially inner portion at the bottom of the cut ranges from 0.2 mm to 0.5 mm.

In advantageous embodiments suitable for tyres for passenger vehicles, the narrow axially inner portion has a depth ranging from 2.0 mm to 5.5 mm, preferably ranging from 3.0 mm to 5.0 mm.

Optionally, so as to optimize the drainage of water, the width of the wide axially outer portion at the bottom of the cut ranges from 1.0 mm to 5.0 mm, preferably from 2.0 mm to 4.5 mm.

In advantageous embodiments suitable for tyres for passenger vehicles, the wide axially outer portion has a depth ranging from 2.0 mm to 5.5 mm, preferably ranging from 3.0 mm to 5.0 mm.

In optional embodiments making it possible to reduce the noise generated by the tread pattern of the tyre, each hybrid transverse cut comprises:

- a so-called inclined axially inner portion made in at least one of the first and second axially lateral portions and forming a mean angle with the axial direction greater than or equal to 15°, preferably greater than or equal to 20°, the inclined axially inner portion being the axially innermost portion of the hybrid transverse cut in the at least one of the first and second axially lateral portions,
- a so-called straight axially outer portion made in at least one of the first and second axially lateral portions and forming a mean angle with the axial direction strictly less than the mean angle of the inclined axially inner portion and arranged axially outside the inclined axially inner portion, the straight axially outer portion being the axially outermost portion of the hybrid transverse cut in the at least one of the first and second axially lateral portions.

In the portion of the tread surface corresponding to the axially inner portion of the hybrid transverse cut, the contact patch is straight. Conversely, in the portion of the tread surface corresponding to the axially outer portion of the hybrid transverse cut, the contact patch is rounded due to the curvature of the tyre. The leading edge of the inclined axially inner portion thus comes into contact with the ground gradually, that is, over a relatively long time interval, due to the relatively large angle and the straightness of the contact patch in the inclined axially inner portion, which limits the noise compared to a cut that forms a substantially zero mean angle with the axial direction and the entire leading edge of which comes into contact with the ground at the same time. Similarly, due to the smaller angle and the roundness of the contact patch in the straight axially outer portion, the leading edge also comes into contact with the ground gradually, which also contributes to limiting the noise.

The mean angle of a portion is determined by taking the straight line extending between two end points of the portion, the two end points being situated at the ends of each portion, equidistant from the leading and trailing edges of each end of the portion.

In some embodiments, the inclined axially inner portion and the straight axially outer portion are adjacent. Adjacent is given to mean that no other portion is axially interposed between the inclined axially inner and straight axially outer portions.

In some optional embodiments, the mean angle of the straight axially outer portion is strictly less than 25°, preferably less than or equal to 20° and more preferably less than or equal to 15°.

Optionally, the narrow axially inner portion comprises at least part of the inclined axially inner portion, and the wide axially outer portion comprises at least part of the straight axially outer portion.

In a first configuration of the inclined axially inner and straight axially outer portions, the narrow axially inner portion comprises:

- the entire inclined axially inner portion, and
- a first part of the straight axially outer portion, and the wide axially outer portion comprises:

- a second part of the straight axially outer portion.

In a second configuration of the inclined axially inner and straight axially outer portions, the narrow axially inner portion comprises:

- a first part of the inclined axially inner portion, and the wide axially outer portion comprises:

- a second part of the inclined axially inner portion,
- the entire straight axially outer portion.

In a third configuration of the inclined axially inner and straight axially outer portions, the narrow axially inner portion consists of the inclined axially inner portion, and the wide axially outer portion consists of the straight axially outer portion.

In optional embodiments, it can be envisaged that the narrow axially inner portion does not emerge into one of the first and second axially outer main circumferential cuts adjacent to it. In these embodiments, the hybrid transverse cuts are said to be blind.

In other optional, preferred embodiments, the narrow axially inner portion emerges into one of the first and second axially outer main circumferential cuts adjacent to it. The mobility of the tread pattern is thus promoted compared to a tyre with blind hybrid transverse cuts, which improves the flattening of the tyre and consequently the rolling resistance.

In preferred, optional embodiments, each hybrid transverse cut comprises an axially terminal portion made axially outside the at least one of the first and second axially lateral portions and communicating with the wide axially outer portion.

This promotes the drainage of water from the tread surface, which represents the surface of the tread of the tyre in contact with the ground.

In optional embodiments that advantageously make it possible to improve the aerodynamics of the tyre, the angle between:

a first tangent to a first point of a connecting line between the bottom of the axially terminal portion of the hybrid transverse cut and the outer surface of the tyre that is axially outside it, and a second tangent to a second point of the bottom of the axially terminal portion of the hybrid transverse cut situated at a distance of 2.5 mm axially inward of the first point of the connecting line, is, in the meridian section plane situated equidistant from the leading edge and the trailing edge of the hybrid transverse cut joined by the connecting line, less than or equal to 20°, preferably less than or equal 15° and more preferably less than or equal to 10°.

The energy consumption associated with the use of a tyre is due not only to the rolling resistance generated by the tyre but also to the aerodynamic resistance of the tyre. In addition to the aspects of the invention explained above and relating to chunking, the inventors also understand that, among the characteristics capable of reducing aerodynamic resistance, the arrangement of the axially terminal portion is relevant. The inventors have optionally found that, the more different the gradient of the bottom of the axially terminal portion of these transverse cuts is from the gradient of the outer surface of the tyre arranged axially outside the transverse cuts, the more the transverse cuts disturb the flow of air on the surface of the tyre and the greater the aerodynamic resistance. With significantly different gradients, each transverse cut forms a sudden and abrupt indentation for the flow of air in the circumferential direction. Conversely, the more similar the gradient of the bottom of the axially terminal portion of these transverse cuts is to the gradient of the outer surface of the tyre arranged axially outside the transverse cuts, the less the transverse cuts disturb the flow of air on the surface of the tyre and the less the aerodynamic resistance. With relatively similar gradients, each transverse cut forms an indentation having a smooth and gradual transition from the outer surface, which disturbs the flow of air in the circumferential direction less.

The first tangent to the first point situated on the connecting line thus characterizes the gradient of the outer surface of the tyre in the meridian plane defined above. The second tangent to the second point situated on the bottom of the axially terminal portion of the cut characterizes the gradient of the bottom of the axially terminal portion of the transverse cut in the meridian plane defined above.

Considering a second point axially situated 2.5 mm from the first point, it is ensured that the gradients are relatively similar at a relatively large distance from the connecting line, that is, where the depth of the transverse cut starts to be significant and therefore where the disturbance of the flow of air has the greatest influence on aerodynamic resistance.

In addition, considering a second point axially situated 2.5 mm from the first point, this makes it possible to consider the embodiments in which the bottom of the axially terminal portion of the transverse cut has a curvature oriented in the same direction as the outer surface of the tyre in the same way as the embodiments in which the bottom of the axially terminal portion of the transverse cut has a change in curvature in the vicinity of the connecting line. Such embodiments can be envisaged in particular in the event that the connection between the bottom of the transverse cut and the outer surface is formed by means of a fillet or a rounded section.

The axially terminal portion allows in particular the drainage of water from the tread surface, which represents the surface of the tread of the tyre in contact with the ground. The axially terminal portion is therefore essential in order to obtain good grip performance on wet ground.

In optional, advantageous embodiments making it possible to facilitate the drainage of water, the distance between the leading edge and the trailing edge measured along the connecting line is greater than or equal to 0.7 mm, preferably ranges from 0.7 mm to 6.0 mm and more preferably ranges from 3.0 mm to 5.0 mm.

In the conventional way, the tyre comprises a crown, two sidewalls, and two beads, each sidewall connecting each bead to the crown. Again in the conventional way, the crown comprises the tread and a crown reinforcement arranged radially inside the tread. The tyre also comprises a carcass reinforcement that is anchored in each bead and extends radially in each sidewall and axially in the crown, radially inside the crown reinforcement.

In the conventional way, the crown reinforcement comprises at least one crown layer comprising reinforcing elements. These reinforcing elements are preferably textile or metallic filamentary elements.

In embodiments that make it possible to obtain performance aspects of tyres known as radial tyres as defined by the ETRTO, the carcass reinforcement comprises at least one carcass layer, the or each carcass layer comprising carcass filamentary reinforcing elements, each carcass filamentary reinforcing element extending substantially in a main direction that forms an angle, as an absolute value, ranging from 80° to 90°, with the circumferential direction of the tyre.

BRIEF DESCRIPTION OF THE FIGURES

The invention will be better understood on reading the following description, given solely by way of non-limiting example and with reference to the drawings, in which.

DETAILED DESCRIPTION

A frame of reference X, Y, Z corresponding respectively to the usual axial (Y), radial (Z) and circumferential (X) directions of a tyre is shown in the figures relating to the tyre.

In the following description and above, unless expressly stated otherwise, the measurements are taken on an unladen and uninflated tyre or on a section of a tyre in a meridian plane.

Figure 1:
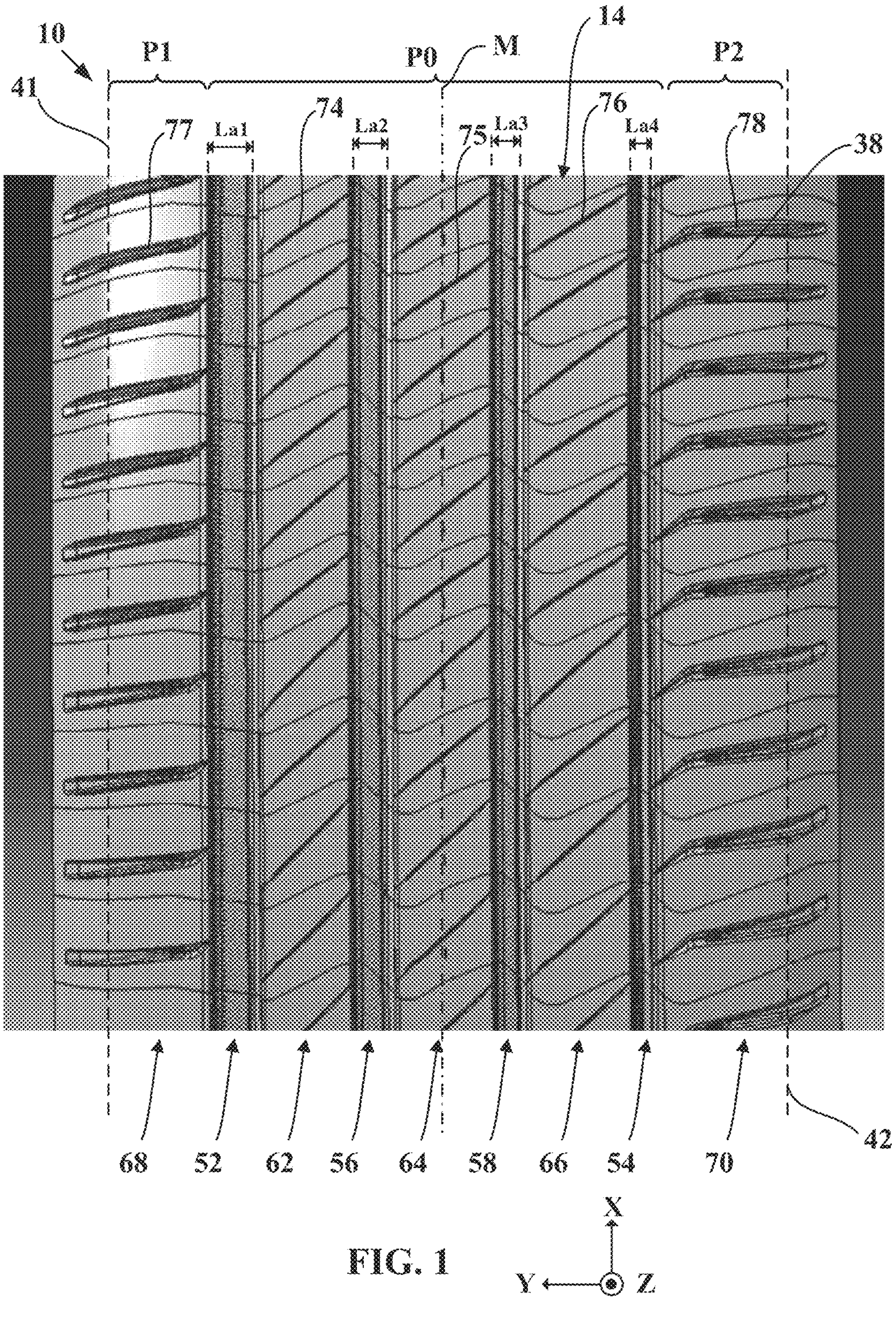
FIG. 1 is a top view of the tread of a tyre according to the invention.
Figure 2:
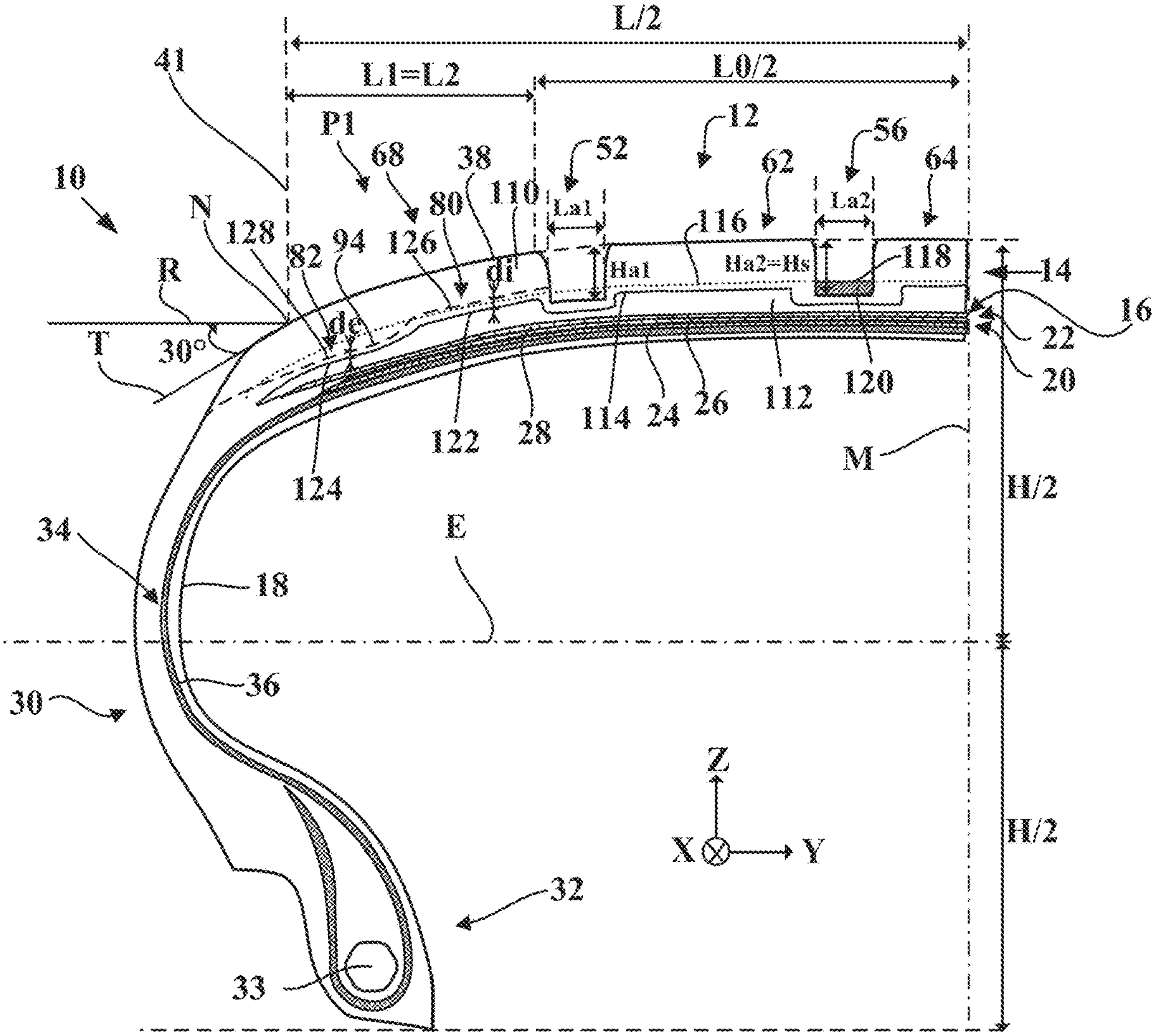
FIG. 2 is a view, in a meridian section plane parallel to the axis of rotation of the tyre, of the tyre in FIG. 1.
Figure 3:
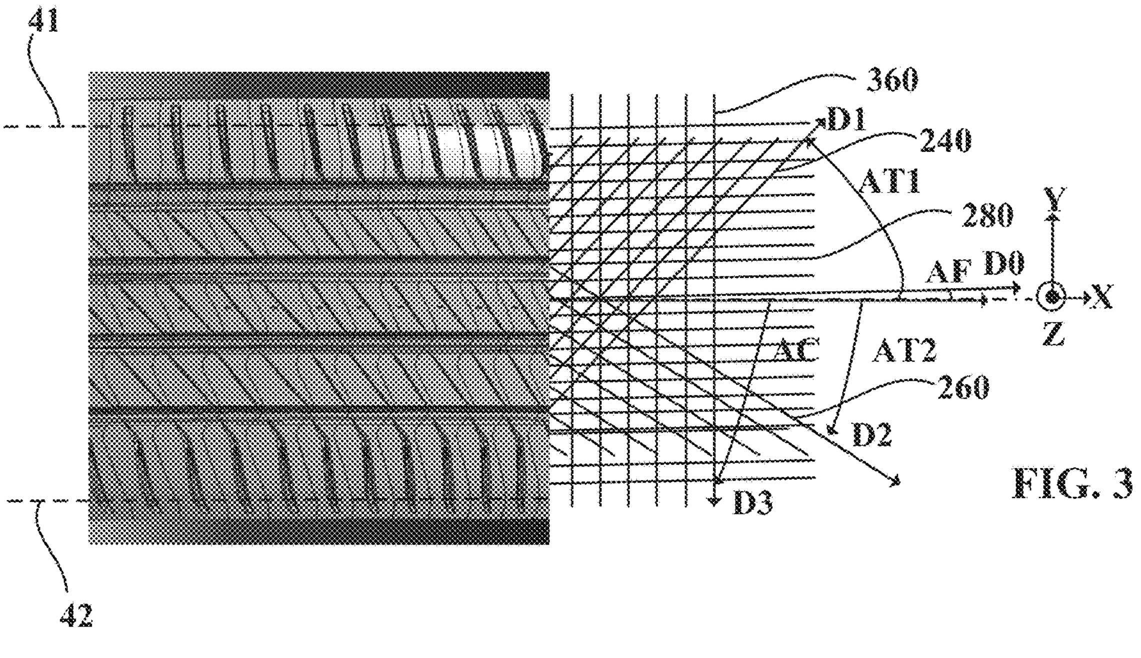
FIG. 3 is a cutaway view of the tyre in FIG. 1, illustrating the arrangement of the filamentary reinforcing elements in and under the crown.

FIGS. 1 to 3 show a tyre according to the invention and denoted by the general reference sign 10. The tyre 10 has a substantially toric shape about an axis of revolution substantially parallel to the axial direction Y. The tyre 10 is intended for a passenger vehicle and has dimensions 235/55 R19. In the various figures, the tyre 10 is depicted as new, that is, when it has not yet been run.

With reference to FIG. 2, the tyre 10 comprises a crown 12 comprising a tread 14 intended to come into contact with the ground when it is running and a crown reinforcement 16 extending in the crown 12 in the circumferential direction X. The tyre 10 also comprises a layer 18 that is airtight with respect to an inflation gas and is intended to delimit an internal cavity closed with a mounting support for the tyre 10 once the tyre 10 has been mounted on the mounting support, for example a rim.

The crown reinforcement 16 comprises a working reinforcement 20 and a hoop reinforcement 22. The working reinforcement 20 comprises at least one working layer and in this case comprises two working layers comprising a radially inner working layer 24 arranged radially inside a radially outer working layer 26.

The hoop reinforcement 22 comprises at least one hooping layer and in this case comprises one hooping layer 28.

The crown reinforcement 16 is radially surmounted by the tread 14. In this case, the hoop reinforcement 22, in this case the hooping layer 28, is arranged radially outside the working reinforcement 20 and is therefore interposed radially between the working reinforcement 20 and the tread 14.

The tyre 10 comprises two sidewalls 30 that extend the crown 12 radially inwards. The tyre 10 also has two beads 32 radially inside the sidewalls 30. Each sidewall 30 connects each bead 32 to the crown 12.

The tyre 10 comprises a carcass reinforcement 34 that is anchored in each bead 32 and, in this instance, is wrapped around a bead wire 33. The carcass reinforcement 34 extends radially in each sidewall 30 and axially in the crown 12, radially inside the crown reinforcement 16. The crown reinforcement 16 is arranged radially between the tread 14 and the carcass reinforcement 34. The carcass reinforcement 34 comprises at least one carcass layer 36.

With reference to FIG. 3, each working layer 24, 26, hooping layer 28 and carcass layer 36 comprises an elastomer matrix in which one or more filamentary reinforcing elements of the corresponding layer are embedded.

The hoop reinforcement 22, in this case the hooping layer 28, comprises one or more hooping filamentary reinforcing elements 280 that are wrapped circumferentially helically in a main direction DO that forms an angle AF which, as an absolute value, is less than or equal to 10°, preferably less than or equal to 7° and more preferably less than or equal to 5° with the circumferential direction X of the tyre 10. In this case, AF=−5°.

Each radially inner working layer 24 and radially outer working layer 26 respectively comprises working filamentary reinforcing elements 240, 260 extending in main directions D1, D2 that form oppositely oriented angles AT1 and AT2 respectively, which, as an absolute value, are strictly greater than 10°, preferably ranging from 15° to 50° and more preferably ranging from 15° to 30°, with the circumferential direction X of the tyre 10. In this case, AT1=−26° and AT2=+26°.

The carcass layer 36 comprises carcass filamentary reinforcing elements 360 extending in a main direction D3 forming an angle AC which, as an absolute value, is greater than or equal to 60°, preferably ranging from 80° to 90° and in this case AC=+90°, with the circumferential direction X of the tyre 10.

Each hooping filamentary reinforcing element 280 conventionally comprises two multifilament strands, each multifilament strand being made up of a spun yarn of aliphatic polyamide monofilaments, in this case nylon, with a thread count equal to 140 tex, these two multifilament strands being twisted in a helix individually at 250 turns per metre in one direction and then twisted together in a helix at 250 turns per metre in the opposite direction. These two multifilament strands are wound in a helix around each other. As a variant, use could be made of a hooping filamentary reinforcing element comprising one multifilament strand made up of a spun yarn of aliphatic polyamide monofilaments, in this case nylon, with a thread count equal to 140 tex, and one multifilament strand made up of a spun yarn of aromatic polyamide monofilaments, in this case aramid, with a thread count equal to 167 tex, these two multifilament strands being twisted in a helix individually at 290 turns per metre in one direction and then twisted together in a helix at 290 turns per metre in the opposite direction. These two multifilament strands are wound in a helix around each other. This variant will give AT1=−29° and AT2=+29°.

Each working filamentary reinforcing element 240, 260 is an assembly of two steel monofilaments wound in a helix at a pitch of 14 mm, each steel monofilament having a diameter equal to 0.30 mm. As a variant, use could also be made of an assembly of six steel monofilaments having a diameter equal to 0.23 mm and comprising an inner layer of two monofilaments wound together in a helix at a pitch of 12.5 mm in a first direction, for example the Z direction, and an outer layer of four monofilaments wound together in a helix around the inner layer at a pitch of 12.5 mm in a second direction opposite to the first direction, for example the S direction. In another variant, each working filamentary reinforcing element is made up of one steel monofilament having a diameter equal to 0.30 mm. More generally, the steel monofilaments have diameters ranging from 0.25 mm to 0.32 mm.

Each carcass filamentary reinforcing element 360 conventionally comprises two multifilament strands, each multifilament strand being made up of a spun yarn of polyester monofilaments, in this case PET, these two multifilament strands being twisted in a helix individually at 240 turns per metre in one direction and then twisted together in a helix at 240 turns per metre in the opposite direction. Each of these multifilament strands has a thread count equal to 220 tex. In other variants, use could be made of thread counts equal to 144 tex and twists equal to 420 turns per metre or thread counts equal to 334 tex and twists equal to 270 turns per metre.

With reference to FIGS. 1 and 2, the tread 14 comprises a tread surface 38 by means of which the tread 14 comes into contact with the ground. The tread surface 38 is intended to come into contact with the ground when the tyre 10 is running on the ground. The tread surface is axially delimited by first and second axial edges 41, 42 passing through each point N arranged on either side of the mid-plane M and for which the angle between the tangent T to the tread surface 38 and a straight line R parallel to the axial direction Y passing through this point is equal to 30°.

The tread 14 comprises an axially central portion P0 and first and second axially lateral portions P1, P2 arranged axially outside the axially central portion P0 axially on either side of the axially central portion P0 in relation to the mid-plane M of the tyre 10.

Without being specific to the embodiment illustrated, the axially central portion P0 has an axial width L0 greater than or equal to 50%, preferably greater than or equal to 60%, and less than or equal to 80%, preferably less than or equal to 70%, of the axial width L of the tread surface 38 of the tyre 10 when new. Each first and second axially lateral portion P1, P2 has an axial width L1, L2 less than or equal to 25%, preferably less than or equal to 20%, and greater than or equal to 5%, preferably greater than or equal to 10%, of the axial width L of the tread surface 38 of the tyre 10 when new. The ratio of the axial width L0 of the central portion P0 to the axial width L1, L2 of each first and second axially lateral portion P1, P2 is greater than or equal to 3.0, preferably ranges from 3.0 to 5.0 and more preferably ranges from 4.0 to 4.5.

The tread 14 comprises N>1 main circumferential cuts, in this case N main circumferential grooves, comprising first, second, third and fourth main circumferential cuts respectively denoted by reference signs 52, 54, 56, 58. The first and second main circumferential cuts 52, 54 are arranged axially on either side of the mid-plane M of the tyre 10 and are the axially outermost main circumferential cuts of the tread 14.

The first axially lateral portion P1 and the second axially lateral portion P2 are respectively arranged axially outside the first axially outer main circumferential cut 52 and the second axially outer main circumferential cut 54. The first axially lateral portion P1 extends axially from the first axial edge 41 of the tread surface 38 to the first main circumferential cut 52. The second axially lateral portion P2 extends axially from the second axial edge 42 of the tread surface 38 to the second main circumferential cut 54.

Each main circumferential cut 52 to 58 is provided with rounded chamfers. Each main circumferential cut 52 to 58 has a depth Ha1, Ha2 ranging from 4.0 mm to the tread-pattern height Hs, preferably ranging from 5.0 mm to the tread-pattern height Hs and more preferably ranging from 5.5 mm to the tread-pattern height Hs. Each depth Ha1, Ha2 is greater than or equal to 50% of the tread-pattern height Hs. In this case, Hs=6.5 mm, Ha1=6.0 mm for each first and second axially outer main circumferential cut 52, 54 and Ha2=6.5 mm for each main circumferential cut 56, 58 of the axially central portion P0. Each main circumferential cut 52, 54, 56, 58 thus advantageously has a depth such that Ha1/Hs≥75%, Ha2/Hs≥75% and more preferably Ha1/Hs≥90%, Ha2/Hs≥90%.

Each main circumferential cut 52 to 58 respectively has an axial width La1, La2, La3, La4 greater than or equal to 1.0 mm, preferably greater than or equal to 5.0 mm and more preferably ranging from 5.0 mm to 20.0 mm. In this case, La1=15.0 mm, La2=13.0 mm, La3=10.30 mm and La4=7.0 mm.

The axially central portion P0 comprises central ribs and in this case first, second and third central ribs respectively denoted by reference signs 62, 64, 66. Each central rib 62, 64, 66 is arranged axially between two of the adjacent main circumferential cuts 52 to 58 and is axially delimited by two adjacent main circumferential cuts 52 to 58.

Each central rib 62, 64, 66 comprises transverse cuts 74, 75, 76 having a width less than or equal to 1.0 mm and more preferably strictly less than or equal to 0.6 mm and in this case equal to 0.4 mm. Each transverse cut 74, 75, 76 has a depth Hb equal to 3.5 mm.

Each first and second axially lateral portion P1, P2 respectively comprises a first and a second lateral rib respectively denoted by reference signs 68, 70 and in this case is respectively made up of each first and second lateral rib 68, 70.

The tread 14 comprises transverse cuts 77, 78 at least partially made in at least one of the first and second axially lateral portions P1, P2 and in this case at least partially made in each first and second axially lateral portion P1, P2. These transverse cuts 77, 78 are referred to as hybrid for the reasons described above. At least 50%, preferably at least 75%, more preferably at least 90% and in this case 100% of the transverse cuts at least partially made in at least one of the first and second axially lateral portions P1, P2 and in this case at least partially made in each first and second axially lateral portion P1, P2 are hybrid transverse cuts 77, 78.

With reference to FIGS. 4 to 9, the hybrid transverse cuts 78 will now be described; when the tyre is mounted on a wheel, these are the hybrid transverse cuts situated on the outside of the wheel and therefore the outside of the vehicle.

Each hybrid transverse cut 78 is provided with chamfers 79 and circumferentially delimited by a leading edge 85 and a trailing edge 87. Each hybrid transverse cut 78 comprises a so-called narrow axially inner portion 80, a so-called wide axially outer portion 82 and an axially terminal portion 83 made axially outside the second axially lateral portion P2 and communicating with the wide axially outer portion 82. Each hybrid transverse cut 78 has a curvilinear length Lot of the part of each hybrid transverse cut made in the second axially lateral portion P2. In this case, Lot=45 mm. The portions 80, 82 and 83 are adjacent.

The narrow axially inner portion 80 is the axially innermost portion of the hybrid transverse cut 78 in the second axially lateral portion P2. The narrow axially inner portion 80 extends from an axially inner end 84 to an axially outer end 86. The narrow axially inner portion 80 emerges into the main circumferential cut 54 adjacent to it. The narrow axially inner portion has a curvilinear length Loi at least equal to 20% and at most equal to 75% of the curvilinear length Lot. In this case, Loi=23 mm, that is, 51% of the curvilinear length Lot.

The wide axially outer portion 82 communicates with the narrow axially inner portion 80 and is arranged axially outside the narrow axially inner portion 80. The wide axially outer portion 82 is the axially outermost portion of the hybrid transverse cut 78 in the second axially lateral portion P2. The wide axially outer portion 82 extends from an axially inner end 88, in this case coincident with the axially outer end 86, to an axially outer end 90. The wide axially outer portion has a curvilinear length Loe. In this case, Loe=22 mm.

The axially terminal portion 83 extends from an axially inner end 91, in this case coincident with the axially outer end 90, to an axially outer end. The axially outer end 93 is embodied by a connecting line 92 between the bottom 94 of the axially terminal portion 83 of the hybrid transverse cut 78 and the outer surface 96 of the tyre 10 that is axially outside it.

Figure 4:
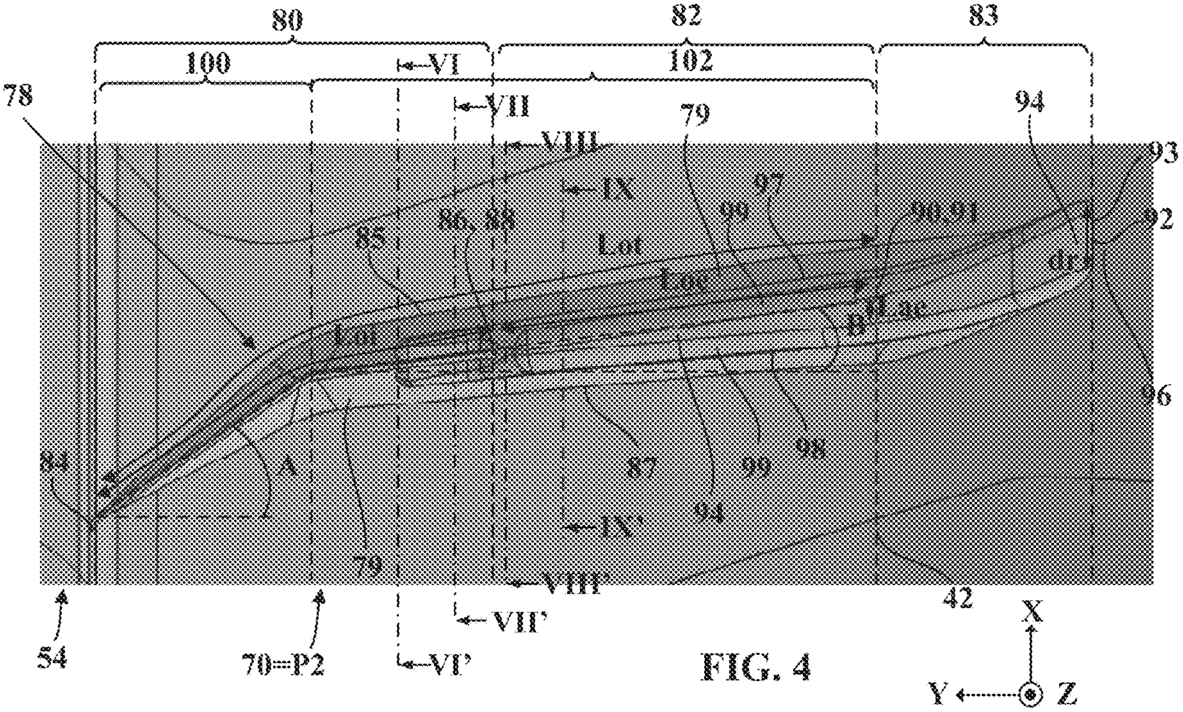
FIG. 4 is a top view of a hybrid transverse cut of the tyre in FIG. 1.
Figure 5:
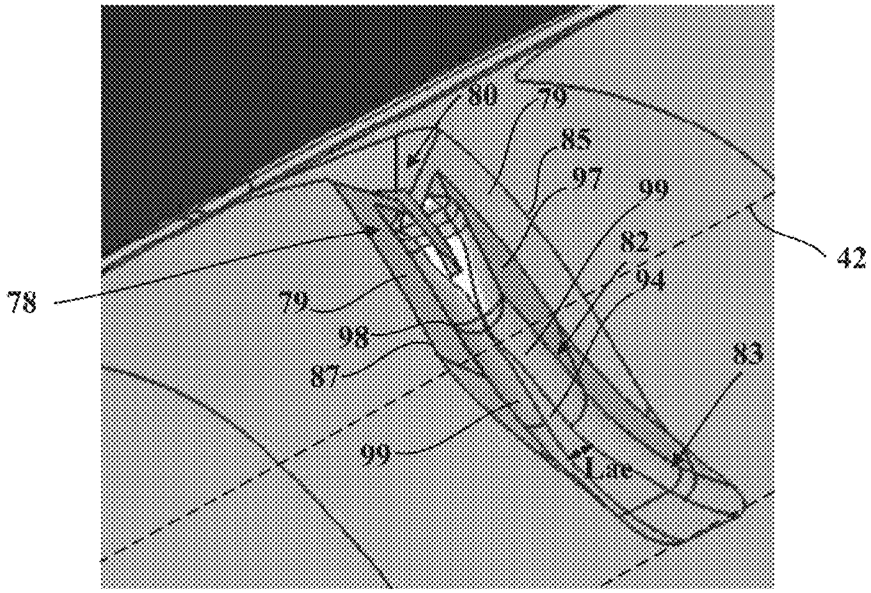
FIG. 5 is a side view of the hybrid transverse cut in FIG. 4, FIGS. 6 to 9 are views in the different section planes VI-VI', VII-VII', VIII-VIII' and IX-IX' respectively of the hybrid transverse cut in FIGS. 4 and 5.
Figure 6:
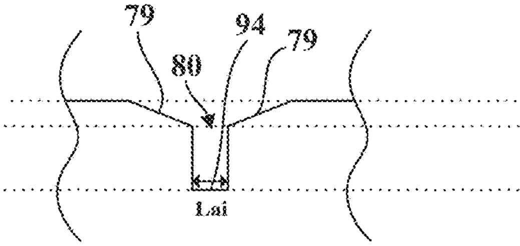
Figure 7:
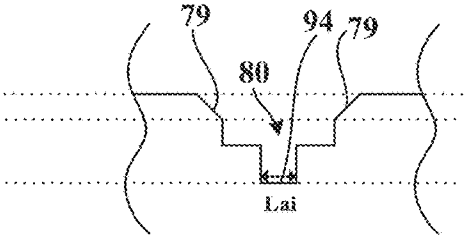
Figure 8:
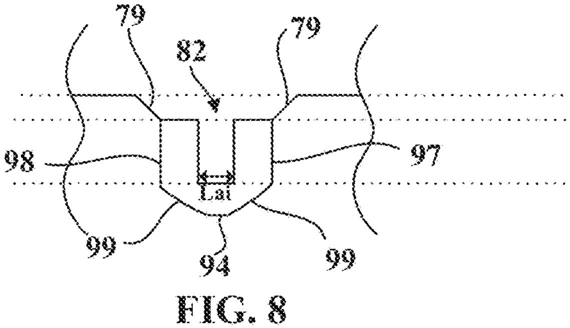
Figure 9:
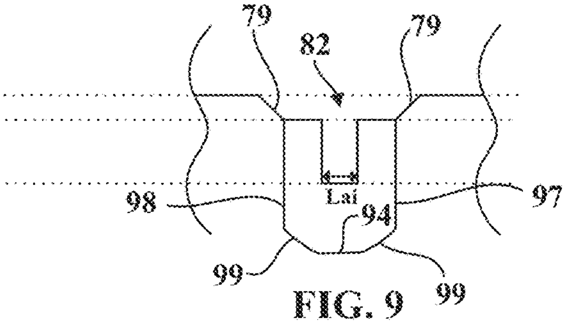

It will be noted that in FIG. 4, for reasons of clarity, the curvilinear lengths are not shown as being the lengths measured along the curve passing equidistant from the leading edge 85 and trailing edge 87 between the two ends of the hybrid transverse cut 78 or of each portion 80, 82. However, as described above, they must be measured along the curve passing equidistant from the leading edge 85 and trailing edge 87 between the two ends of the hybrid transverse cut 78 or of each portion 80, 82.

As illustrated in FIGS. 6 to 9, the narrow axially inner portion 80 has a bottom 94 of the hybrid transverse cut, and at the bottom 94 of the cut, a width Lai ranging from 0.2 mm to 0.6 mm, preferably from 0.2 mm to 0.5 mm, and in this case Lai=0.4 mm. The narrow axially inner portion 80 has a depth ranging from 2.0 mm to 5.5 mm, preferably ranging from 3.0 mm to 5.0 mm and in this case equal to 4.4 mm.

The wide axially outer portion has, at the bottom 94 of the cut, a width Lae ranging from 0.7 mm to 5.0 mm, preferably ranging from 1.0 mm to 5.0 mm and more preferably ranging from 2.0 mm to 4.5 mm. As defined above, the width Lae is the maximum distance, at the bottom 94 of the cut, between the two main lateral faces 97, 98 of the wide axially outer portion 82 and therefore measured in this case at the end 90. As can be seen in FIG. 1, the wide axially outer portions 82 have different widths Lae randomly distributed in order to limit the whining noise. In this instance, the different widths Lae used are equal to 3.1 mm, 3.7 mm and 4.1 mm. The wide axially outer portion 82 has a depth ranging from 2.0 mm to 5.5 mm, preferably ranging from 3.0 mm to 5.0 mm and in this case equal to 4.6 mm.

As illustrated in FIGS. 4, 5, 8 and 9, the wide axially outer portion has two main lateral faces, leading 97 and trailing 98, connected to the bottom 94 of the hybrid transverse cut 78 by fillets 99.

Within the axially terminal portion 83, the distance dr between the leading edge 85 and the trailing edge 87 measured along the connecting line 92 is greater than or equal to 0.7 mm, preferably ranges from 0.7 mm to 6.0 mm and more preferably ranges from 3.0 mm to 5.0 mm. In this case, the different values of dr are equal to 3.4 mm, 3.6 mm and 4.7 mm.

Returning to FIGS. 4 and 5, each hybrid transverse cut 78 comprises a so-called inclined axially inner portion 100 made in the second axially lateral portion P2 and a so-called straight axially outer portion 102 arranged axially outside the inclined axially inner portion 100, also made in the second axially lateral portion P2. The portions 100 and 102 are adjacent.

The inclined axially inner portion 100 forms a mean angle A with the axial direction Y greater than or equal to 15°, preferably greater than or equal to 20° and in this case A=23°. The inclined axially inner portion 100 is the axially innermost portion of the hybrid transverse cut 78 in the second axially lateral portion P2.

The straight axially outer portion 102 forms a mean angle B with the axial direction Y strictly less than the mean angle of the inclined axially inner portion 100. The mean angle of the straight axially outer portion 102 is strictly less than 25°, preferably less than or equal to 20° and more preferably less than or equal to 15°, and in this case equal to 8°. The straight axially outer portion 102 is the axially outermost portion of the hybrid transverse cut 78 in the second axially lateral portion P2.

In this instance, the narrow axially inner portion 80 comprises at least part of the inclined axially inner portion 100 and in this case comprises the entire inclined axially inner portion 100, together with a first part of the straight axially outer portion 102 up to the common end 86, 88 of the portions 80, 82. The wide axially outer portion 82 comprises a second part of the straight axially outer portion from the end 86, 88 up to the second axial edge 42 of the tread surface 38.

Figure 10:
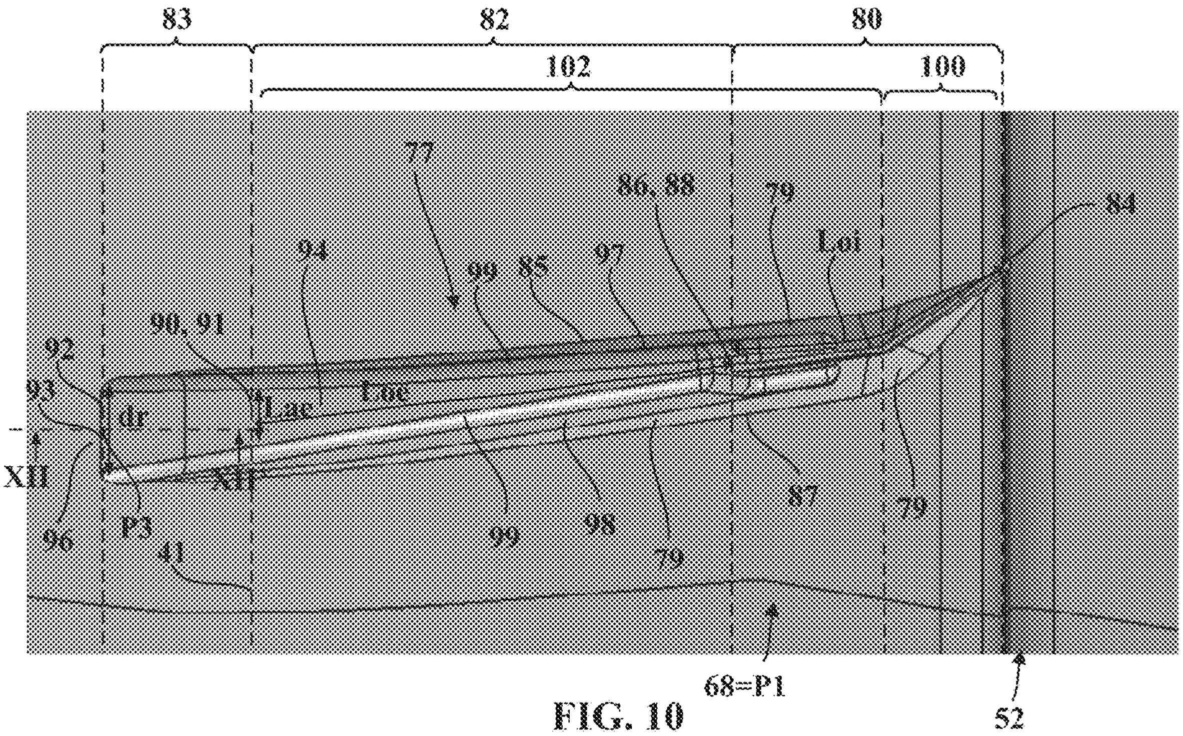
FIG. 10 is a similar view to that in FIG. 4 of another hybrid transverse cut of the tyre in FIG. 1.

FIG. 10 shows one of the hybrid transverse cuts 77. For the sake of concision, FIG. 10 uses identical references for elements similar to those shown in FIG. 4 illustrating a hybrid transverse cut 78.

Unlike the hybrid transverse cuts 78, each hybrid transverse cut 77 is such that Lot=38 mm, Loi=14 mm and Loe=24 mm. In addition, the angles A and B are such that A=25° and B=8°.

Returning to FIG. 2, the tyre 10 comprises a tread layer 110 and a supporting layer 112 of the tread layer 110. The supporting layer 112 is arranged radially inside the tread layer 110. The tread layer 110 and the supporting layer 112 are contiguous by means of an interface 114. The supporting layer 112 has very low rolling resistance characterized by a dynamic loss tanDMAX23, measured in accordance with ASTM D-5992-96 at a temperature of 23° and at a frequency of 10 Hz, equal to 0.095.

Still in the meridian section plane of FIG. 2, a regulation wear trajectory 116 is defined that is parallel to the tread surface 38 of the tyre 10 and passes through the radially outer surface 118 of the regulation wear indicator 120. In the embodiment illustrated, at least part 122 of the portion of the interface 114 arranged radially in line with the narrow axially inner portion 80 is arranged radially outside at least part 124 of the portion of the interface 114 arranged radially in line with the wide axially inner portion 82.

The bottom 94 of a hybrid transverse cut 77 is also shown. The entire bottom 94 of each hybrid transverse cut 77, 78 is arranged radially outside the interface 114 between the tread layer 110 and the supporting layer 112. In addition, at least part 126 of the bottom 94 of the narrow axially inner portion 80 is arranged at a radial distance di from the interface 114 strictly greater than the radial distance de at which at least part 128 of the bottom 94 of the wide axially outer portion 82 is arranged.

In the embodiment illustrated, at least 60%, preferably at least 75% and in this case 100% of the curvilinear length Loi of the narrow axially inner portion 80 is arranged at a radial distance di from the interface 114 strictly greater than a mean radial distance dem at which the bottom 94 of the wide axially outer portion 82 is arranged.

More specifically, the bottom 94 of the narrow axially inner portion 80 is arranged at a mean radial distance dim from the interface 114 strictly greater than the mean radial distance dem at which the bottom 94 of the wide axially outer portion 82 is arranged. The mean radial distance dim between the bottom of the narrow axially inner portion 80 and the interface 114 ranges from 0.5 mm to 1.5 mm, preferably from 0.6 mm to 1.2 mm. The mean radial distance dem between the bottom 94 of the wide axially outer portion 82 and the interface 114 ranges from 0.3 mm to 1.0 mm, preferably from 0.4 mm to 0.9 mm. In this case, dim=1.0 mm and dem=0.5 mm.

Figure 11:
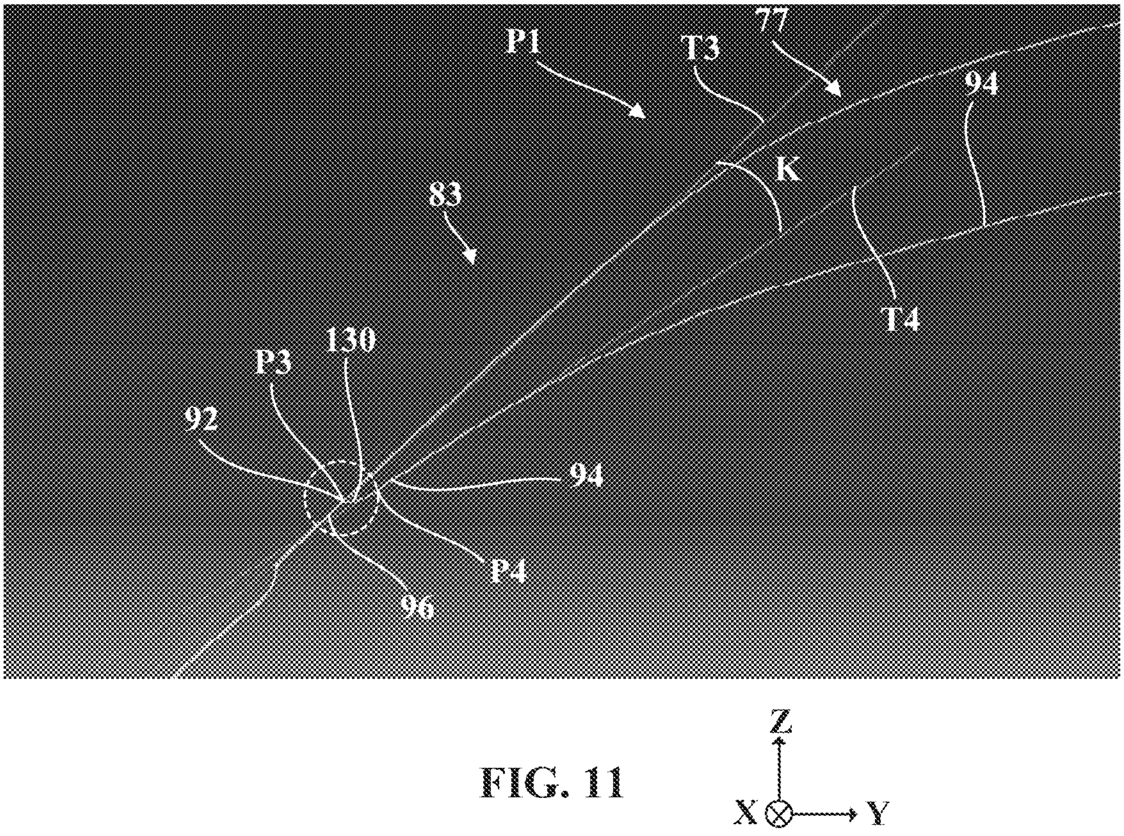
FIG. 11 is a detail view, in a meridian section plane parallel to the axis of rotation of the tyre, of the point at which a hybrid transverse cut of the tyre in FIG. 1 connects with the outer surface of the tyre.

FIG. 11 illustrates in a view in a meridian section plane XII-XII' in FIG. 10 situated equidistant from the leading edge 85 and the trailing edge 87 joined by the connecting line 92. The bottom 94 of the axially terminal portion 83 comprises a fillet 130 forming a junction between the bottom 94 and the connecting line 92. FIG. 11 shows a first tangent T3 to a first point P3 and a second tangent T4 to a second point P4. The first point P3 is the point in the plane XII-XII' that is the point of the connecting line 92. The second point P4 is a point of the bottom 94 of the axially terminal portion 83 of the hybrid transverse cut 77 situated at a distance of 2.5 mm axially inward of the first point P3 of the connecting line 92. In FIG. 11, this distance of 2.5 mm is shown by a dashed circle with a diameter of 5.0 mm and the centre of which is the first point P3. The angle K between the first tangent T3 and the second tangent T4 is less than or equal to 20°, preferably less than or equal to 15° and in this case equal to 11°. In other even more advantageous embodiments, the angle K could be less than or equal to 10°.

The invention is not limited to the embodiment described above.

The invention claimed is:

1. A tire for a passenger vehicle, the tire comprising a tread intended to come into contact with a ground when the tire is running, via a tread surface, the tread comprising:

main circumferential cuts having depths greater than or equal to 50% of a tread-pattern height, comprising first and second axially outer main circumferential cuts arranged axially on either side of a mid-plane of the tire, the first and second axially outer main circumferential cuts being axially outermost main circumferential cuts of the tread;

a first axially lateral portion arranged axially outside the first axially outer main circumferential cut and extending axially from a first axial edge of the tread surface to the first axially outer main circumferential cut; and a second axially lateral portion arranged axially outside the second axially outer main circumferential cut and extending axially from a second axial edge of the tread surface to the second axially outer main circumferential cut, the tire comprising a tread layer and a supporting layer of the tread layer, the supporting layer being arranged radially inside the tread layer, wherein the tread comprises hybrid transverse cuts made at least partially in at least one of the first and second axially lateral portions, each hybrid transverse cut comprising:

a narrow axially inner portion having, at a bottom of the hybrid transverse cut, a width ranging from 0.2 mm to 0.6 mm, the narrow axially inner portion being an axially innermost portion of the hybrid transverse cut in the at least one of the first and second axially lateral portions; and a wide axially outer portion having, at the bottom of the hybrid transverse cut, a width ranging from 0.7 mm to 5.0 mm, communicating with the narrow axially inner portion, arranged axially outside the narrow axially inner portion, the wide axially outer portion being an axially outermost portion of the hybrid transverse cut in the at least one of the first and second axially lateral portions, wherein each hybrid transverse cut has a hybrid transverse cut bottom, an entire bottom of each hybrid transverse cut being arranged radially outside an interface between the tread layer and the supporting layer, wherein the wide axially outer portion has a mean radial distance dem between the bottom of the wide axially outer portion and the interface, wherein at least 60% of a curvilinear length of a bottom of the narrow axially inner portion has a radial distance from the interface strictly greater than the mean radial distance dem, and wherein the mean radial distance dem ranges from 0.3 mm to 1.0 mm.

2. The tire according to claim 1, wherein the narrow axially inner portion has a mean radial distance dim between the bottom of the narrow axially inner portion and the interface, and wherein the mean radial distance dim is strictly greater than the mean radial distance dem.

3. The tire according to claim 1, wherein at least part of a portion of the interface arranged radially in line with the narrow axially inner portion is arranged radially outside at least part of a portion of the interface arranged radially in line with the wide axially outer portion.

4. The tire according to claim 1, wherein the tread comprises hybrid transverse cuts partially made in each first and second axially lateral portion.

5. The tire according to claim 1, wherein at least 50% of transverse cuts at least partially made in at least one of the first and second axially lateral portions are hybrid transverse cuts.

6. The tire according to claim 1, wherein the narrow axially inner portion has a curvilinear length at least equal to 20% and at most equal to 75% of a curvilinear length of a part of each hybrid transverse cut made in the at least one of the first and second axially lateral portions.

7. The tire according to claim 1, wherein the width of the narrow axially inner portion at the bottom of the hybrid transverse cut ranges from 0.2 mm to 0.5 mm.

8. The tire according to claim 1, wherein the width of the wide axially outer portion at the bottom of the hybrid transverse cut ranges from 1.0 mm to 5.0 mm.

9. The tire according to claim 1, wherein each hybrid transverse cut comprises:

an inclined axially inner portion made in at least one of the first and second axially lateral portions and forming a mean angle with an axial direction greater than or equal to 15°, the inclined axially inner portion being an axially innermost portion of the hybrid transverse cut in the at least one of the first and second axially lateral portions; and a straight axially outer portion made in at least one of the first and second axially lateral portions, and forming a mean angle with the axial direction strictly less than the mean angle of the inclined axially inner portion, and arranged axially outside the inclined axially inner portion, the straight axially outer portion being an axially outermost portion of the hybrid transverse cut in the at least one of the first and second axially lateral portions.

10. The tire according to claim 9, wherein the mean angle of the straight axially outer portion is strictly less than 25°.

11. The tire according to claim 9, wherein the narrow axially inner portion comprises at least part of the inclined axially inner portion, and wherein the wide axially outer portion comprises at least part of the straight axially outer portion.

12. The tire according to claim 1, wherein the narrow axially inner portion merges into one of the first and second axially outer main circumferential cuts adjacent to the narrow axially inner portion.

13. The tire according to claim 1, wherein each hybrid transverse cut comprises an axially terminal portion made axially outside the at least one of the first and second axially lateral portions and communicating with the wide axially outer portion.

* * * * *